United States Patent
Goto et al.

(10) Patent No.: US 6,592,802 B1
(45) Date of Patent: Jul. 15, 2003

(54) PROCESS FOR PRODUCTION OF POLYMER SHEET AND OPTICAL POLYMER SHEET

(75) Inventors: Hideki Goto, Itami (JP); Junji Tanaka, Tokyo (JP); Toshimasa Eguchi, Yokohama (JP); Tsuyoshi Takenaka, Kawanishi (JP); Shinji Ohno, Kobe (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 10/089,216

(22) PCT Filed: Oct. 5, 2000

(86) PCT No.: PCT/JP00/06948

§ 371 (c)(1),
(2), (4) Date: Mar. 26, 2002

(87) PCT Pub. No.: WO01/26876

PCT Pub. Date: Apr. 19, 2001

(30) Foreign Application Priority Data

Oct. 8, 1999 (JP) .............................. 11-287497
Oct. 25, 1999 (JP) .............................. 11-302092
Nov. 4, 1999 (JP) .............................. 11-314207
Mar. 29, 2000 (JP) .............................. 2000-91875

(51) Int. Cl.$^7$ .............................................. B29C 35/08
(52) U.S. Cl. .................. 264/496; 264/446; 264/447; 264/448; 264/494; 264/495; 264/212; 264/213; 264/216; 427/487; 427/508
(58) Field of Search .................. 264/446, 447, 264/448, 494, 495, 496, 212, 213, 216; 427/487, 508; 428/220

(56) References Cited

U.S. PATENT DOCUMENTS 4,414,275 A  * 11/1983  Woods ..................... 428/352

FOREIGN PATENT DOCUMENTS

| EP | 0 623 440 A1 | 11/1994 |
| EP | 0 916 474 A1 | 5/1999 |
| JP | 53-68099 | 6/1978 |
| JP | 54-126559 | 10/1979 |
| JP | 5-162229 | 6/1993 |
| WO | WO 95/00876 | 1/1995 |

OTHER PUBLICATIONS

Official Action of the Japanese Patent Office dated Dec. 16, 2002, 4 pages.

* cited by examiner

Primary Examiner—James J. Seidleck
Assistant Examiner—Travis B Ribar
(74) Attorney, Agent, or Firm—Smith, Gambrell & Russell, LLP

(57) ABSTRACT

The present invention provides a process for continuously producing a polymer sheet having an excellent surface smoothness, an apparatus for producing such a polymer sheet, and an optical polymer sheet produced by such a process. The process for producing a polymer sheet comprises coating or laminating, on a polymer base sheet, an ultraviolet-curing resin composition, adhering the coated or laminated polymer base sheet to a member having a smooth surface whose maximum surface roughness (Rmax) satisfies Rmax$\leq$0.1 $\mu$m, in a state that the ultraviolet-curing resin composition is soft, and applying an ultraviolet light to transfer smoothness of the smooth surface of the member onto the polymer base sheet.

12 Claims, 2 Drawing Sheets

PROCESS FOR PRODUCTION OF POLYMER SHEET AND OPTICAL POLYMER SHEET

TECHNICAL FIELD

The present invention relates to a process for efficiently producing a polymer sheet superior in surface smoothness and small in retardation, as well as to an optical polymer sheet produced by the process.

BACKGROUND ART

Glass substrates have been used as a transparent electrode substrate for liquid crystal display device. Liquid crystal display devices using a glass substrate have had problems in that the large thickness of glass substrate makes it difficult to produce a liquid crystal display device of small thickness and light weight and the use of glass incurs insufficient impact resistance.

To alleviate these drawbacks of liquid crystal display devices using a glass substrate, it has been investigated to use an optical polymer sheet for production of a liquid crystal display device of lighter weight and improved impact resistance.

For example, in JP-A-53-68099 and JP-A-54-126559, it is disclosed to continuously produce a liquid crystal display device using, in place of a glass substrate, a long polyester film having a conductive metal oxide vapor-deposited thereon. However, the polyester film (polymer sheet) has no sufficient surface smoothness, unlike a glass substrate having a very good surface smoothness as a result of polishing. When, in particular, a STN (super twisted nematic) type liquid crystal display device is produced in order to obtain a very fine display, the surface smoothness of the above polymer sheet becomes a very serious problem because in the liquid crystal display device, display is made utilizing the birefringence of the liquid crystal present between substrates having a substrate-to-substrate distance controlled at a 0.1 $\mu$m accuracy.

To improve the surface smoothness of polymer sheet, a method was proposed which comprises casting, on a polished glass or the like, an ultraviolet-curing resin composition or a thermosetting resin composition, both of which are liquid, and curing the composition to obtain a sheet. This method, however, has a problem in that the sheet obtained is fragile and causes cracking or chipping during its handling; therefore, there is no clear advantage by use of the polymer sheet over use of a glass substrate. Further, the method is low in productivity, resulting in a substrate of high cost.

DISCLOSURE OF THE INVENTION

The present invention aims at providing a process for continuously and efficiently producing a polymer sheet superior in surface smoothness and showing excellent properties when used as an optical polymer sheet for a substrate of a liquid crystal display device or the like; and an optical polymer sheet superior in the above properties, produced using a resin suitable for the above process.

The present invention provides the followings.

(1) A process for producing a polymer sheet, which comprises coating or laminating, on a polymer base sheet, an ultraviolet-curing resin composition, adhering the coated or laminated polymer base sheet to a member having a smooth surface whose maximum surface roughness (Rmax) satisfies Rmax≦0.1 $\mu$m, in a state that the ultraviolet-curing resin composition is soft, and applying an ultraviolet light to transfer smoothness of the smooth surface of the member onto the polymer base sheet.

(2) A process according to the above (1), wherein the member having a smooth surface can transmit an ultraviolet light of a particular wavelength and, after the ultraviolet light has been applied to the ultraviolet-curing resin composition from a side of the member not adhering to the polymer base sheet and the composition has been cured, can be peeled from the polymer base sheet.

(3) A process according to the above (1), wherein the polymer base sheet is transparent and can transmit an ultraviolet light and, after the ultraviolet light has been applied to the ultraviolet-curing resin composition from a side of the polymer base sheet not adhering to the member having a smooth surface and the composition has been cured, can be peeled from the member.

(4) A process according to any of the above (1) to (3), wherein a releasing agent is continuously fed to the member having a smooth surface.

(5) A process according to the above (4), which comprises, after application of an ultraviolet light, a step of removing the releasing agent transferred onto the surface of the polymer base sheet.

(6) A process according to the above (4) or (5), wherein the releasing agent contains at least a fluorine compound or a silicon compound.

(7) A process according to any of the above (1) to (6), wherein the member having a smooth surface is a roll.

(8) A process according to any of the above (1) to (6), wherein the member having a smooth surface is an endless belt having a flat area of 30 cm or more extending in the movement direction.

(9) A process according to any of the above (1) to (6), wherein the member having a smooth surface is a plastic film having a smooth surface.

(10) A process according to the above (9), wherein the plastic film is subjected to a slidability-imparting treatment at a side opposite to the smooth surface.

(11) An apparatus for producing a polymer sheets comprising:
   a hollow transparent roll which has a smooth surface whose maximum surface roughness (Rmax) satisfies Rmax≦0.1 $\mu$m and which can transmit an ultraviolet light, and
   an ultraviolet source placed in the hollow portion of the roll.

(12) An optical polymer sheet produced by a process set forth in any of the above (1) to (10).

(13) An optical polymer sheet according to the above (12), wherein the polymer is a polyethersulfone.

Figure 1:
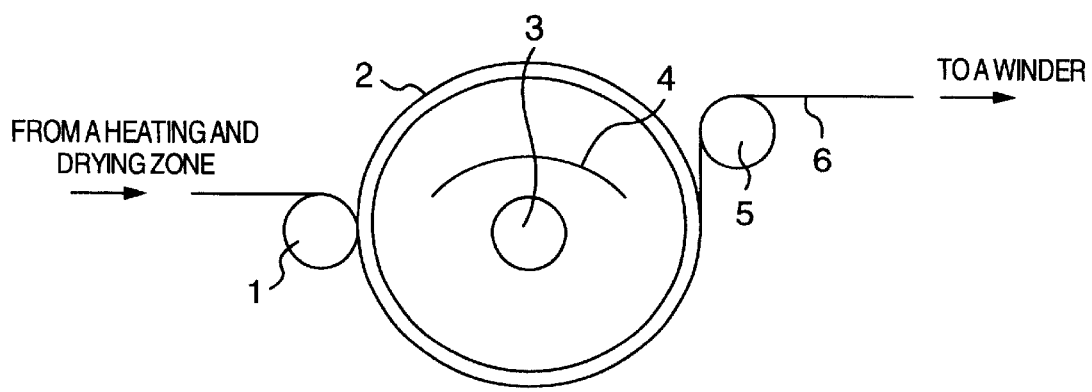
FIG. 1 is a schematic sectional view of a hollow quartz glass roll having a high-pressure mercury lamp inside, which constitutes the production apparatus used in Example 1.
Figure 2:
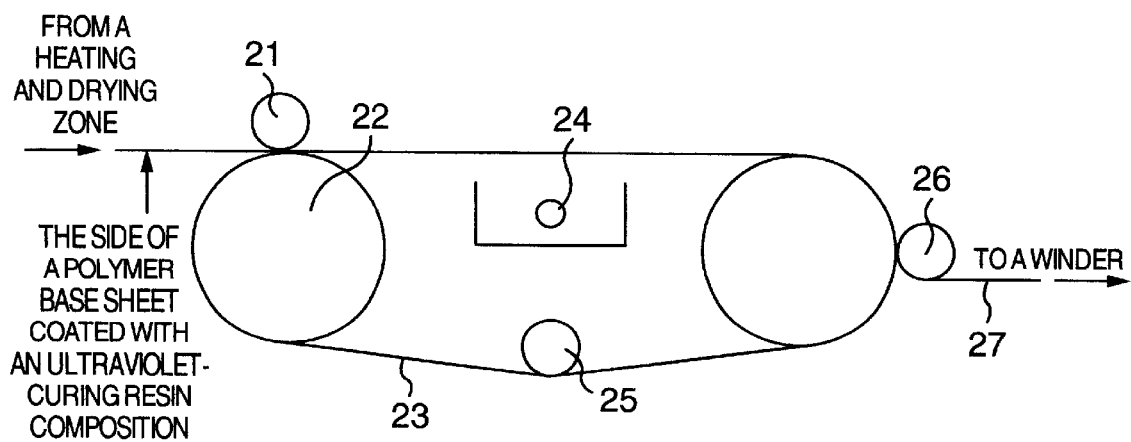
FIG. 2 is a schematic view of a transparent endless belt having an ultraviolet source inside, which constitutes the production apparatus used in Example 3.
Figure 3:
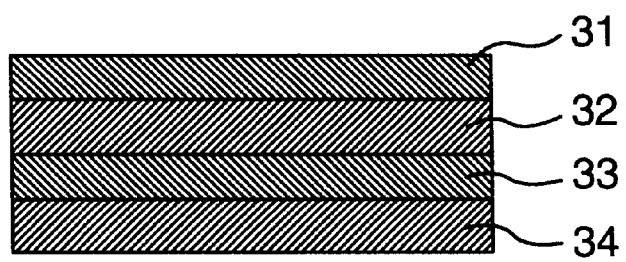
FIG. 3 is a schematic sectional view of the layer constitution obtained in Example 6.
Figure 4:
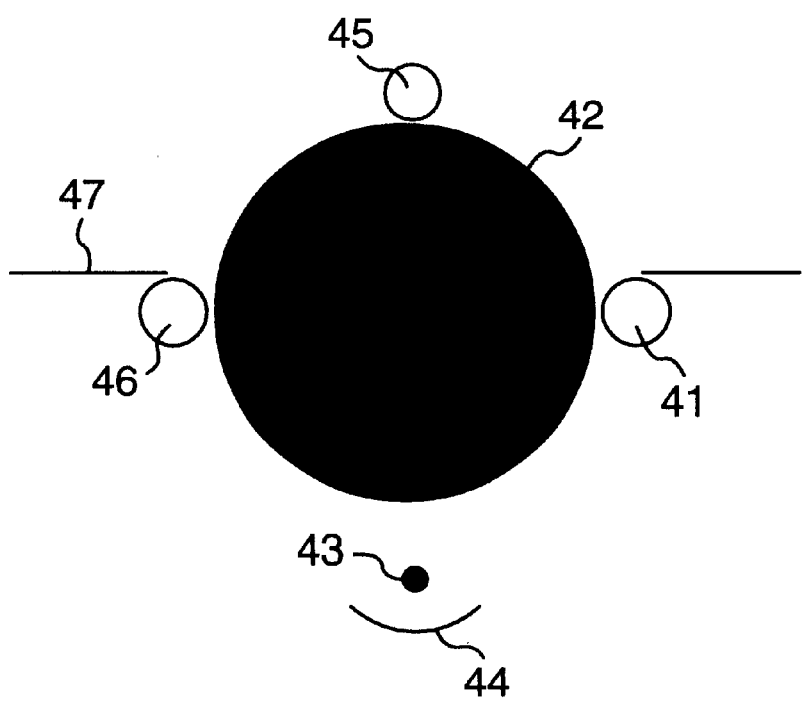
FIG. 4 is a schematic sectional view of a metal roll of the production apparatus used in Example 7.

The numerals used in FIGS. 1 to 4 refer to the followings.
1: Rubber-made nip roll
2: Hollow quartz glass roll
3: High-pressure mercury lamp (with a water jacket)
4: Reflector plate
5: Peeling roll
6: Polymer sheet
21: Rubber-made nip roll
22: Mirror-surface roll for driving
23: Transparent endless belt
24: High-pressure mercury lamp
25: Tension roll
26: Peeling roll
27: Polymer sheet
31: Layer subjected to slidability-imparting treatment
32: Plastic film (the side contacting with 33 is a smooth surface)
33: Ultraviolet-cured resin layer
34: Polymer sheet
41: Rubber-made nip roll
42: Metal roll
43: High-pressure mercury lamp (with a water jacket)
44: Reflector plate
45: Releasing agent-feeding roll
46: Peeling roll
47: Polymer sheet

DETAILED DESCRIPTION OF THE INVENTION

As the polymer used in the polymer base sheet of the present invention, there can be mentioned, for example, polyester, polysulfone, polyethersulfone, polyetherketone, polyetheretherketone, polyimide, polyamideimide, polycarbonate, epoxy resin, acrylic resin, norbornene-based polymer and mixed resins thereof. However, the polymer is not restricted thereto. Of these, particularly preferred is polyethersulfone well balanced in transparency, heat resistance, processability and impact resistance, from the standpoint of production of a liquid crystal display device. The thickness of the polymer base sheet is preferably 10 μm to 500 μm, more preferably 50 μm to 400 μm. When the thickness of the polymer base sheet is less than 10 μm, the sheet cuts easily, making the handling difficult and, moreover, it is difficult to maintain the distance between substrates of a liquid crystal display device. When the thickness is more than 500 μm, the sheet cracks easily when used as a substrate of a liquid crystal display device and bent.

As the ultraviolet-curing resin composition used in the present invention, there can be mentioned, for example, a liquid ultraviolet-curing resin composition composed mainly of an acrylate compound or the like, and a sheet-like ultraviolet-curing resin composition composed mainly of an epoxy resin, an unsaturated polyester resin or the like. The former resin composition (liquid resin composition) is coated on a polymer base sheet using a coater and, when the composition contains a solvent, the solvent is vaporized using a dryer. The latter resin composition (sheet-like resin composition) is laminated on a polymer base sheet. It is possible to use, besides the ultraviolet-curing resin, a resin which can be cured by an electromagnetic wave such as infrared light, visible light, particle beam, ultrasonic wave or the like, or by an elastic wave.

In the present invention, when the polymer base sheet having a ultraviolet-curing resin composition thereon is adhered to a member having a smooth surface of $Rmax \leq 0.1$ μm, the ultraviolet-curing resin composition must be soft or in a liquid state so that smoothness of the smooth surface of the member can be sufficiently transferred onto the ultraviolet-curing resin composition. The ultraviolet-curing resin composition includes a type which is soft or a liquid per se at room temperature even without containing a solvent. When another type is used, it is necessary that heating is conducted by a heater or the like and then adhesion is made, or that the lamination (adhesion) temperature is raised and adhesion and softening are made simultaneously.

As the method for adhesion, there are used a nip roll, electric pinning, etc. However, the method is not restricted thereto.

In the present invention, the member having a smooth surface, to be adhered to the polymer base sheet having an ultraviolet-curing resin composition thereon, must have a surface roughness of $Rmax \leq 0.1$ μm. When the Rmax is more than 0.1 μm, it is impossible to obtain a liquid crystal display device capable of showing good display. As the member having a smooth surface of $Rmax \leq 0.1$ μm, there can be mentioned a roll, an endless belt and a plastic film. The roll can be produced by polishing the surface of a quartz glass tube, a glass tube or a chromium-plated roll, and the endless belt can be produced, for example, by polishing the surface of a stainless steel belt or by using a cast film of a transparent polymer. As the plastic film, there can be mentioned, for example, a polyethylene terephthalate (hereinafter referred to as PET), a film produced by casting, and a surface-polished film. The side of the plastic film opposite to the smooth surface is preferably subjected to a slidability-imparting treatment, because when the plastic film subjected to the treatment is adhered to the polymer base sheet and transferred through a production line, the transfer speed is increased, the adhesion of foreign matter caused by frictional electrification is prevented, and productivity is strikingly increased. Further, when a plastic film is used, it can be peeled after application of an ultraviolet light and, therefore, the plastic film can also function as a protective film for prevention of mar formation or foreign matter adhesion which may occur in a production line. When an endless belt is used, it preferably has a flat area of 30 cm or more extending in the movement direction. By curing the ultraviolet-curing resin composition on this area, a warpage-free rigid sheet can be obtained.

In the present invention, it is preferred that a releasing treatment is applied or a releasing agent is continuously fed, to the member having a smooth surface, to be adhered to the polymer base sheet having an ultraviolet-curing resin composition thereon. By feeding a releasing agent to the member having a smooth surface, it is possible to prevent the uncured ultraviolet-curing resin from adhering to the member and peeling from the polymer base sheet. If the feeding of the releasing agent is not continuous, the releasing of the ultraviolet-curing resin is not made satisfactorily. There is no particular restriction as to the method for continuously feeding the releasing agent; however, there can be mentioned, for example, a method which comprises continuously contacting a member having a smooth rubber surface containing a releasing agent, with the member having a smooth surface to which the polymer base sheet is to be adhered.

It is preferred that the apparatus for production of a polymer sheet according to the present invention has a device for removing the releasing agent transferred onto the polymer base sheet. Transfer of the releasing agent onto the polymer base sheet is not desirable because it invites contamination of the production line. There is no particular restriction as to the device for removing the releasing agent transferred onto the polymer base sheet; however, there can be mentioned, for example, a cleaning device using an organic solvent.

As to the kind of the releasing agent used in the present invention, there is no particular restriction, either; however, a releasing agent containing a fluorine compound (e.g. carbon fluoride) or a silicon compound (e.g. silicone oil) is preferred.

In the present invention, the curing of the ultraviolet-curing resin composition can be conducted by using, as the member having a smooth surface, an ultraviolet-transmittable transparent member having a smooth surface of Rmax≦0.1 µm and by applying an ultraviolet light (emitted from a high-pressure mercury lamp or the like) from behind the member having a smooth surface (that is, from the side of the member opposite to the smooth surface). Thereby, an ultraviolet-cured resin layer can be formed on the polymer base sheet in a state that the smoothness of the smooth surface of the member has been transferred onto the resin layer, and a polymer sheet having a smooth surface can be produced. As the ultraviolet-transmittable transparent member, there can be mentioned, for example, a quartz roll and a transparent film sheet. For example, a hollow quartz roll having an ultraviolet source in the hollow portion is used and an ultraviolet light is applied from the source via the quartz roll; thereby, an ultraviolet-curing resin can be cured in a state that the smoothness of the smooth surface of the member has been transferred onto the resin.

In the present invention, also when there are used, as the member, a member having an opaque smooth surface of Rmax≦0.1 µm and, as the polymer base sheet, an ultraviolet-transmittable polymer base sheet, and an ultraviolet light is applied from the side of the polymer base sheet opposite to the side having an ultraviolet-curing resin composition, a polymer sheet having a smooth surface can be produced. In this case, the polymer base sheet used must have transparency; however, since many polymer sheets have transparency, this method of producing a smooth polymer sheet is very useful industrially. The polymer sheets produced as above find optical applications and are useful, for example, as a transparent substrate for a liquid crystal display device or as a substrate for optical mirror.

BEST MODE FOR CARRYING OUT THE INVENTION

The present invention is hereinafter described by way of Examples. However, the present invention is in no way restricted by the Examples. The optical properties of a sheet were measured according to the following methods.

(1) Thickness of Polymer Sheet

The thicknesses of a polymer sheet were measured in the width direction of the sheet at intervals of 20 mm using a contact type dial gauge, and the average of the measurements was taken as the thickness of the polymer sheet.

(2) Maximum Surface Roughness (Rmax) of Polymer Sheet

The surface unevennesses of a polymer sheet were measured in the width direction of the sheet over the entire width at scanning intervals of 2 mm using a contact type precision level difference meter (ALPHA-STEP 200 produced by TENCOR INSTRUMENTS), and the maximum surface unevenness of the measurements was taken as the maximum surface roughness (Rmax) of the polymer sheet.

(3) Maximum Surface Roughness (Rmax) of Member Having Smooth Surface

The surface unevennesses of a member having a smooth surface were measured in the width direction over the entire width at cut-off lengths of 0.8 mm using a contact type surface roughness tester produced by K. K. Mitsutoyo, and the maximum surface unevenness of the measurements was taken as the maximum surface roughness (Rmax) of the member having a smooth surface.

EXAMPLE 1

The following operation was made using as a polymer base sheet a polyethersulfone having a thickness of 200 µm and the maximum surface roughness (Rmax) of 0.3 µm, and using a sheet-producing apparatus comprising a payoff, a coater section, a heating and drying zone, a hollow quartz glass roll having a high-pressure mercury lamp in the hollow portion, and a winder. First, as an ultraviolet-curing resin composition a uniform solution obtained by mixing, at 50° C., 100 parts by weight of an epoxy acrylate prepolymer having a molecular weight of 1,540 and a melting point of 70° C. (VR-60, a product of Showa Highpolymer Co., Ltd.), 300 parts by weight of butyl acetate, 100 parts by weight of cellosolve acetate and 2 parts by weight of benzoin ethyl ether was coated on the polymer base sheet in a wet film thickness of 5 µm, by the gravure roll coater of the coater section; and the coated polymer base sheet was heated at 100° C. for 5 minutes in the heating and drying zone to remove the solvent. The ultraviolet-curing resin composition after solvent removal was in a paste-like soft state. Successively, the dried sheet was adhered, by using a rubber-made nip roll, to the hollow quartz glass roll of diameter=300 mm and Rmax=0.04 µm having inside a high-pressure mercury lamp of 80 w/cm (output); an ultraviolet light was applied to cure the ultraviolet-curing resin composition; and the resulting sheet was wound up by the winder to continuously obtain a polymer sheet. The exposure time of the ultraviolet light was 40 seconds. The Rmax of the obtained polymer sheet at the side which had contacted with the roll, was measured to obtain 0.04 µm.

Next, on the polymer sheet was formed a $SiO_2$ film of 500 Å in thickness by a DC magnetron method by introducing a mixed gas of oxygen/argon gas (9%) at an initial vacuum of $3\times10^{-4}$ Pa and conducting sputtering at a vacuum of $3\times10^{-1}$ Pa. Thereon was formed a transparent conductive film made of indium tin oxide (ITO) having an atomic ratio [In/(In+Sn)] of 0.98, by a DC magnetron method by introducing a mixed gas of oxygen/argon gas (4%) at an initial vacuum of $3\times10^{-4}$ Pa and conducting sputtering at a vacuum of $1\times10^{-1}$ Pa. The film thickness was 1,600 Å and the specific resistance was $4\times10^{-4}$ Ω.cm.

Next, on the resulting sheet was coated a resist, and development was made. Pattern etching was conducted in an etching solution of 40° C. which was 10 vol. % HCl, whereby a display pattern of diagonal length=3 inch and L/S=150 µm/50 µm was formed. Then, an alignment film for STN was formed by coating and subjected to a firing treatment at 150° C. for 2 hours. Thereafter, a rubbing treatment was conducted so as to obtain an alignment of 240° twist. Then, a spacer was spread; a sealing agent was coated and cured at 130° C. to form a cell; and a liquid crystal composition for STN was poured into the cell. A polarizer was attached at such a location as to give the maximum contrast, whereby a liquid crystal display device was produced. The liquid crystal display device was subjected to an operation test at a driving voltage of 0 to ±5 V; as a result, there was no display unevenness due to the abnormal cell gap of liquid crystal, and good display was obtained.

EXAMPLE 2

The following operation was made using as a polymer base sheet a polycarbonate having the maximum surface roughness (Rmax) of 0.2 μm, and using a sheet-producing apparatus comprising a payoff, a coater section, a heating and drying zone, a chromium-plated roll of diameter=400 mm and Rmax=0.03 μm, a high-pressure mercury lamp of 80 w/cm (output) capable of applying an ultraviolet light to the surface of the chromium-plated roll, and a winder. First, coating to drying of the ultraviolet-curing resin composition were conducted in the same manner as in Example 1. Successively, the resulting sheet was adhered, by using a rubber-made nip roll, to the chromium-plated roll of diameter=400 mm and Rmax=0.03 μm controlled at 50° C.; an ultraviolet light was applied from the side of the polymer base sheet opposite to the ultraviolet-curing resin composition side, using the high-pressure mercury lamp of 80 w/cm (output), to cure the ultraviolet-curing resin composition; the resulting sheet was wound up by the winder to continuously obtain a polymer sheet. The exposure time of the ultraviolet light was 30 seconds. The Rmax of the obtained polymer sheet at the side which had contacted with the roll, was measured to obtain 0.03 μm.

A liquid crystal display device was produced in the same manner as in Example 1. The liquid crystal display device was subjected to an operation test at a driving voltage of 0 to ±5 V; as a result, there was no display unevenness due to the abnormal cell gap of liquid crystal, and good display was obtained.

EXAMPLE 3

The following operation was made using as a polymer base sheet a polyethersulfone having a thickness of 200 μm and the maximum surface roughness (Rmax) of 0.3 μm, and using a sheet-producing apparatus comprising a payoff, a coater section, a heating and drying zone, a nip roll, a norbornene-based polycycloolefin-made endless belt of Rmax=0.04 μm having inside a high-pressure mercury lamp, and a winder. First, as an ultraviolet-curing resin composition a uniform solution obtained by mixing, at 50° C., 100 parts by weight of an epoxy acrylate prepolymer having a molecular weight of 1,540 and a melting point of 70° C. (VR-60, a product of Showa Highpolymer Co., Ltd.), 200 parts by weight of butyl acetate, 100 parts by weight of cellosolve acetate and 2 parts by weight of benzoin ethyl ether was coated on the polymer base sheet in a wet film thickness of 10 μm, by the kiss-roll coater of the coater section; and the coated polymer base sheet was heated at 100° C. for 5 minutes in the heating and drying zone to remove the solvent. The ultraviolet-curing resin composition after solvent removal was in a paste-like soft state. Successively, the ultraviolet-curing resin composition side of the dried sheet was adhered, by using a rubber-made nip roll, to the norbornene-based polycycloolefin-made endless belt of Rmax=0.04 μm having a flat area of 50 cm extending in the movement direction and having inside a high-pressure mercury lamp of 100 w/cm (output) (the belt being driven by mirror-surface rolls of Rmax=0.02 μm); an ultraviolet light was applied to cure the ultraviolet-curing resin composition; and the resulting sheet was peeled from the endless belt and wound up by the winder to continuously obtain a polymer sheet. The exposure time of the ultraviolet light was 40 seconds. The Rmax of the obtained polymer sheet at the side which had contacted with the belt, was measured to obtain 0.04 μm.

Next, on the polymer sheet was formed a $SiO_2$ film of 500 Å in thickness by a DC magnetron method by introducing a mixed gas of oxygen/argon gas (9%) at an initial vacuum of $3\times10^{-4}$ Pa and conducting sputtering at a vacuum of $3\times10^{-1}$ Pa. Thereon was formed a transparent conductive film made of indium tin oxide (ITO) having an atomic ratio [In/(In+Sn)] of 0.98, by a DC magnetron method by introducing a mixed gas of oxygen/argon gas (4%) at an initial vacuum of $3\times10^{-4}$ Pa and conducting sputtering at a vacuum of $1\times10^{-1}$ Pa. The film thickness was 1,600 Å and the specific resistance was $4\times10^{-4}$ Ω.cm.

Next, on the resulting sheet was coated a resist, and development was made. Pattern etching was conducted in an etching solution of 40° C. which was 10 vol. % HCl, whereby a display pattern of diagonal length=3 inch and L/S=150 μm/50 μm was formed. Then, an alignment film for STN was formed by coating and subjected to a firing treatment at 150° C. for 2 hours. Thereafter, a rubbing treatment was conducted so as to obtain an alignment of 240° twist. Then, a spacer was spread; a sealing agent was coated and cured at 130° C. to form a cell; and a liquid crystal composition for STN was poured into the cell. A polarizer was attached at such a location as to give the maximum contrast, whereby a liquid crystal display device was produced. The liquid crystal display device was subjected to an operation test at a driving voltage of 0 to ±5 V; as a result, there was no display unevenness due to the abnormal cell gap of liquid crystal, and good display was obtained.

EXAMPLE 4

The following operation was made using as a polymer base sheet a polycarbonate having the maximum surface roughness (Rmax) of 0.2 μm, and using a sheet-producing apparatus comprising a payoff, a coater section, a heating and drying zone, a stainless steel-made endless belt of Rmax 0.03 μm having a flat area of 60 cm extending in the movement direction of the belt, a high-pressure mercury lamp of 80 w/cm (output) capable of applying an ultraviolet light to the surface of the endless belt, and a winder. First, coating to drying of the ultraviolet-curing resin composition were conducted in the same manner as in Example 3. Successively, the ultraviolet-curing resin composition side of the resulting sheet was adhered to the surface of the endless belt by using a rubber-made nip roll; an ultraviolet light was applied from the side of the polymer base sheet opposite to the ultraviolet-curing resin composition side, using the high-pressure mercury lamp of 80 w/cm (output), to cure the ultraviolet-curing resin composition; the resulting sheet was wound up by the winder to continuously obtain a polymer sheet. The exposure time of the ultraviolet light was 30 seconds. The Rmax of the obtained polymer sheet at the side which had contacted with the belt, was measured to obtain 0.03 μm.

A liquid crystal display device was produced in the same manner as in Example 3. The liquid crystal display device was subjected to an operation test at a driving voltage of 0 to ±5 V; as a result, there was no display unevenness due to the abnormal cell gap of liquid crystal, and good display was obtained.

EXAMPLE 5

The following operation was made using as a polymer base sheet a polyethersulfone having a thickness of 200 μm and the maximum surface roughness (Rmax) of 0.3 μm, and using a sheet-producing apparatus comprising a payoff, a coater section, a heating and drying zone, a plastic film, a high-pressure mercury lamp and a winder. First, as an ultraviolet-curing resin composition a uniform solution obtained by mixing, at 50° C., 100 parts by weight of an epoxy acrylate prepolymer having a molecular weight of 1,540 and a melting point of 70° C. (VR-60, a product of Showa Highpolymer Co., Ltd.), 300 parts by weight of butyl acetate, 100 parts by weight of cellosolve acetate and 2 parts by weight of benzoin ethyl ether was coated on the polymer base sheet in a wet film thickness of 5 μm, by the gravure roll coater of the coater section; and the coated polymer base sheet was heated at 100° C. for 5 minutes in the heating and drying zone to remove the solvent. The ultraviolet-curing resin composition after solvent removal was in a paste-like soft state. Successively, the dried sheet was adhered, by using a nip roll, to PET (as a plastic film) of Rmax=0.06 μm; an ultraviolet light of 80 w/cm was applied to cure the ultraviolet-curing resin composition; and the resulting sheet was wound up by the winder to continuously obtain a polymer sheet. The exposure time of the ultraviolet light was 10 seconds. The Rmax of the obtained polymer sheet at the side which had contacted with the plastic film, was measured to obtain 0.06 μm.

Next, on the polymer sheet peeled from the plastic film was formed a $SiO_2$ film of 500 Å in thickness by a DC magnetron method by introducing a mixed gas of oxygen/argon gas (9%) at an initial vacuum of $3 \times 10^{-4}$ Pa and conducting sputtering at a vacuum of $3 \times 10^{-1}$ Pa. Thereon was formed a transparent conductive film made of indium tin oxide (ITO) having an atomic ratio [In/(In+Sn)] of 0.09, by a DC magnetron method by introducing a mixed gas of oxygen/argon gas (4%) at an initial vacuum of $3 \times 10^{-4}$ Pa and conducting sputtering at a vacuum of $1 \times 10^{-1}$ Pa. The film thickness was 1,600 Å and the specific resistance was $4 \times 10^{-4}$ Ω.cm.

Next, on the resulting sheet was coated a resist, and development was made. Pattern etching was conducted in an etching solution of 40° C. which was 10 vol. % HCl, whereby a display pattern of diagonal length=3 inch and L/S=150 μm/50 μm was formed. Then, an alignment film for STN was formed by coating and subjected to a firing treatment at 150° C. for 2 hours. Thereafter, a rubbing treatment was conducted so as to obtain an alignment of 240° twist. Then, a spacer was spread; a sealing agent was coated and cured at 130° C. to form a cell; and a liquid crystal composition for STN was poured into the cell. A polarizer was attached at such a location as to give the maximum contrast, whereby a liquid crystal display device was produced. The liquid crystal display device was subjected to an operation test at a driving voltage of 0 to ±5 V; as a result, there was no display unevenness due to the abnormal cell gap of liquid crystal, and good display was obtained.

EXAMPLE 6

The following operation was made using as a polymer base sheet a polycarbonate having the maximum surface roughness (Rmax) of 0.2 μm, and using a sheet-producing apparatus comprising a payoff, a coater section, a heating and drying zone, a PET as a plastic film whose one side had a Rmax of 0.06 μm and whose other side had been subjected to a slidability-imparting treatment, a high-pressure mercury lamp and a winder. First, coating to drying of the ultraviolet-curing resin composition were conducted in the same manner as in Example 5. Successively, the resulting sheet was adhered, by using a nip roll, to the Rmax=0.06 μm side of the PET controlled at 80° C.; an ultraviolet light was applied from the side of the polymer base sheet opposite to the ultraviolet-curing resin composition side, using the high-pressure mercury lamp of 80 w/cm (output), to cure the ultraviolet-curing resin composition; the resulting sheet was wound up by the winder to continuously obtain a polymer sheet having a constitution as shown by the schematic sectional view of FIG. 3. The exposure time of the ultraviolet light was 30 seconds. The Rmax of the obtained polymer sheet at the side which had contacted with the plastic film, was measured to obtain 0.06 μm. The number of the foreign matter which adhered to the polymer sheet owing to frictional charging, was small.

A liquid crystal display device was produced in the same manner as in Example 5. The liquid crystal display device was subjected to an operation test at a driving voltage of 0 to ±5 V; as a result, there was no display unevenness due to the abnormal cell gap of liquid crystal, and good display was obtained.

EXAMPLE 7

The following operation was made using as a polymer base sheet a polyethersulfone having a thickness of 200 μm and the maximum surface roughness (Rmax) of 0.3 μm, and using a sheet-producing apparatus comprising a payoff, a coater section, a heating and drying zone, a metal roll, a releasing agent-feeding roll, a high-pressure mercury lamp and a winder. First, as an ultraviolet-curing resin composition a uniform solution obtained by mixing, at 50° C., 100 parts by weight of an epoxy acrylate prepolymer having a molecular weight of 1,540 and a melting point of 70° C. (VR-60, a product of Showa Highpolymer Co., Ltd.), 300 parts by weight of butyl acetate, 100 parts by weight of cellosolve acetate and 2 parts by weight of benzoin ethyl ether was coated on the polymer base sheet in a wet film thickness of 5 μm, by the gravure roll coater of the coater section; and the coated polymer base sheet was heated at 100° C. for 5 minutes in the heating and drying zone to remove the solvent. The ultraviolet-curing resin composition after solvent removal was in a paste-like soft state. Successively, the dried sheet was adhered, by using a nip roll, to the metal roll of diameter=400 mm and Rmax=0.04 μm, and an ultraviolet light of 80 w/cm was applied from the side of the base sheet opposite to the ultraviolet-curing resin composition side to cure the ultraviolet-curing resin composition. The metal roll was contacted with a silicone rubber roll capable of feeding a silicone oil-containing releasing agent, and the releasing agent was continuously fed onto the surface of the metal roll. The resulting sheet was wound up by the winder to continuously obtain a polymer sheet. The exposure time of the ultraviolet light was 40 seconds. The Rmax of the obtained sheet at the side which had contacted with the metal roll, was measured to obtain 0.04 μm.

Next, on the polymer sheet was formed a $SiO_2$ film of 500 Å in thickness by a DC magnetron method by introducing a mixed gas of oxygen/argon gas (9%) at an initial vacuum of $3 \times 10^{-4}$ Pa and conducting sputtering at a vacuum of $3 \times 10^{-1}$ Pa. Thereon was formed a transparent conductive film made of indium tin oxide (ITO) having an atomic ratio [In/(In+Sn)] of 0.98, by a DC magnetron method by introducing a mixed gas of oxygen/argon gas (4%) at an initial vacuum of $3 \times 10^{-4}$ Pa and conducting sputtering at a vacuum of $1 \times 10^{-1}$ Pa. The film thickness was 1,600 Å and the specific resistance was $4 \times 10^{-4}$ Ω.cm.

Next, on the resulting sheet was coated a resist, and development was made. Pattern etching was conducted in an etching solution of 40° C. which was 10 vol. % HCl, whereby a display pattern of diagonal length=3 inch and L/S=150 μm/50 μm was formed. Then, an alignment film for STN was formed by coating and subjected to a firing treatment at 150° C. for 2 hours. Thereafter, a rubbing treatment was conducted so as to obtain an alignment of 240° twist. Then, a spacer was spread; a sealing agent was coated and cured at 130° C. to form a cell; and a liquid crystal composition for STN was poured into the cell. A polarizer was attached at such a location as to give the maximum contrast, whereby a liquid crystal display device was produced. The liquid crystal display device was subjected to an operation test at a driving voltage of 0 to ±5 V; as a result, there was no display unevenness due to the abnormal cell gap of liquid crystal, and good display was obtained.

Comparative Example 1

A polymer sheet was continuously obtained by making the same operation as in Example 5 except that the sheet-producing apparatus comprising a payoff, a coater section, a heating and drying zone, a laminate roll, a high-pressure mercury lamp and a winder was replaced by an apparatus comprising a payoff, a coater section, a heating and drying zone, a high-pressure mercury lamp and a winder and no member having a smooth surface was used and an ultraviolet light was applied for 40 seconds from the side of the polymer base sheet coated with the ultraviolet-curing resin composition, using the high-pressure mercury lamp of 80 w/cm (output). The Rmax of the polymer sheet at the ultraviolet-curing resin composition side was measured to obtain 0.2 μm. Thereafter, a liquid crystal display device was produced in the same manner as in Example 5. The device was subjected to an operation test at a driving voltage of 0 to ±5 V; as a result, display unevenness owing to the abnormal cell gap of liquid crystal was seen at the positions corresponding to the Rmax points of the polymer sheet.

All the liquid crystal display devices produced using each of the polymer sheets of Examples 1 to 7 showed good display. That is, an optical polymer sheet of good surface smoothness could be obtained in each of Examples 1 to 7. In contrast, no polymer sheet of good surface smoothness could be obtained in Comparative Example 1 because the application of ultraviolet light and the curing of ultraviolet-curing resin composition was made using no member of Rmax≦0.1 μm; as a result, the resultant liquid crystal display device showed display unevenness.

Thus, by using the process of the present invention, polymer sheets of good surface smoothness could be produced stably, efficiently and continuously. The sheets produced by the present process were very suitable as an optical polymer sheet and, when used as a transparent electrode substrate in a liquid crystal display device, were light and resistant to cracking as compared with glass substrates and gave no display unevenness, i.e. good display.

Industrial Applicability

According to the present invention, an optical polymer sheet superior in surface smoothness and small in retardation can be produced efficiently and continuously. Therefore, the sheet can be applied to a light and impact-resistant display substrate used in liquid crystal display device, electroluminescence device or the like and may also be applied to optical materials for optical disc, waveguide, etc.

What is claimed is:

1. A process for producing a polymer sheet, which comprises coating or laminating, on a polymer base sheet, an ultraviolet-curing resin composition, and then drying the coated polymer base sheet; adhering the coated or laminated polymer base sheet to a member having a smooth surface whose maximum surface roughness, Rmax, satisfies Rmax≦0.1 μm, in a state that the ultraviolet-curing resin composition is soft even after drying; and applying an ultraviolet light to transfer smoothness of the smooth surface of the member onto the ultraviolet curing resin composition on the polymer base sheet.

2. A process according to claim 1, further comprising wherein the member having a smooth surface can transmit an ultraviolet light of a particular wavelength and, after the ultraviolet light has been applied to the ultraviolet-curing resin composition from a side of the member not adhering to the polymer base sheet and the composition has been cured, peeling said member from the polymer base sheet.

3. A process according to claim 1, further comprising wherein the polymer base sheet is transparent and can transmit an ultraviolet light and, after the ultraviolet light has been applied to the ultraviolet-curing resin composition from a side of the polymer base sheet not adhering to the member having a smooth surface and the composition has been cured, peeling said polymer base sheet from the member.

4. A process according to claim 1, wherein a releasing agent is continuously fed to the member having a smooth surface.

5. A process according to claim 4, which comprises, after application of an ultraviolet light, a step of removing the releasing agent transferred onto the surface of the polymer base sheet.

6. A process according to claim 4, wherein the releasing agent contains at least a fluorine compound or a silicon compound.

7. A process according to claim 1, wherein the member having a smooth surface is a roll.

8. A process according to claim 1, wherein the member having a smooth surface is an endless belt having a flat area of 30 cm or more extending in the movement direction.

9. A process according to claim 1, wherein the member having a smooth surface is a plastic film having a smooth surface.

10. A process according to claim 9, wherein the plastic film is subjected to a slidability-imparting treatment at a side opposite to the smooth surface.

11. The process according to claim 2 further comprising forming an $SiO_2$ film on said polymer sheet by sputtering a conductive film thereon.

12. The process according to claim 11 further comprising coating said polymer sheet having a conductive film thereon with a resist and developing a pattern with an etching solution.

* * * * *